R. M. WESTLAKE.
Automatic Device for Advertising.
No. 231,204.   Patented Aug. 17, 1880.
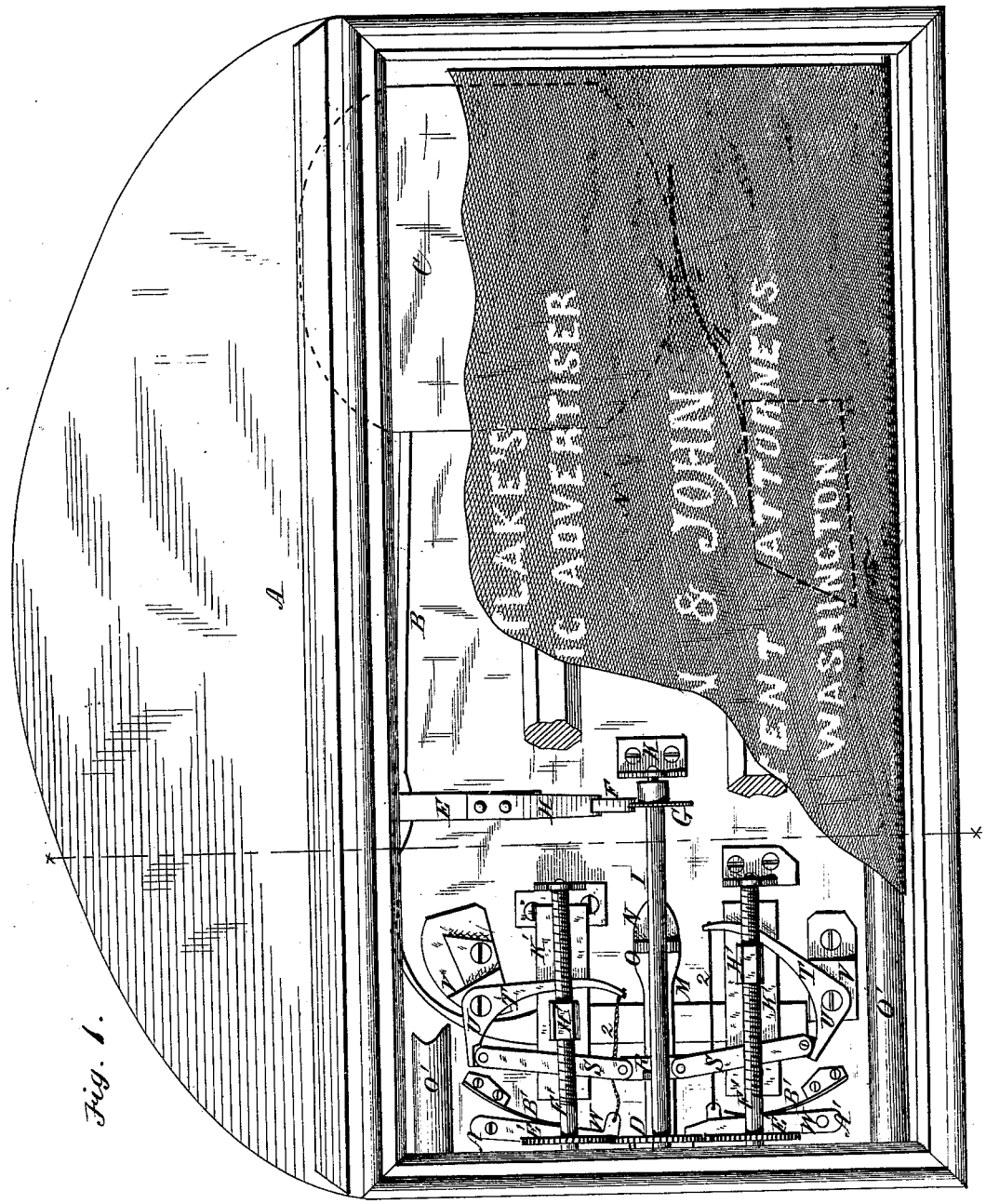

2 Sheets—Sheet 2.
R. M. WESTLAKE.
Automatic Device for Advertising.
No. 231,204. Patented Aug. 17, 1880.
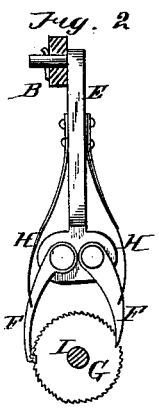
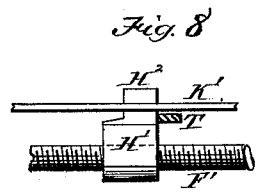
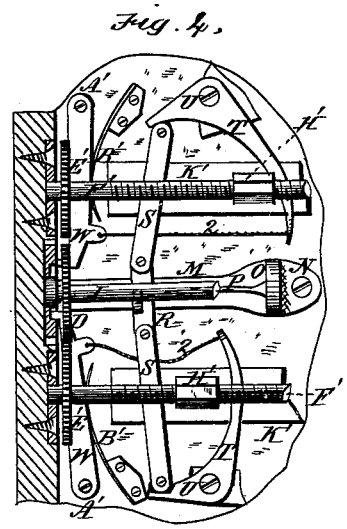
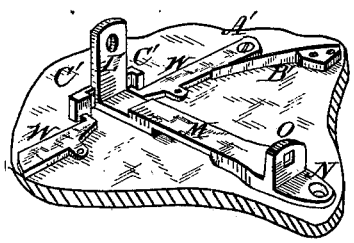
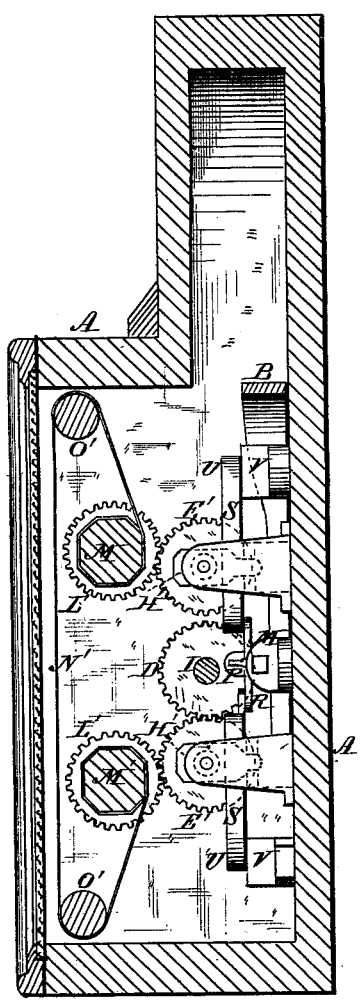
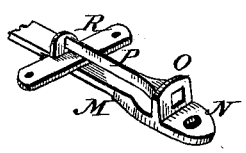

United States Patent Office.

REUBEN M. WESTLAKE, OF LONG ISLAND CITY, ASSIGNOR OF ONE-HALF OF HIS RIGHT TO JOHN C. KELLEY, OF NEW YORK, N. Y.

AUTOMATIC DEVICE FOR ADVERTISING.

SPECIFICATION forming part of Letters Patent No. 231,204, dated August 17, 1880.

Application filed January 12, 1880.

*To all whom it may concern:*

Be it known that I, REUBEN MAN WESTLAKE, of Long Island City, in the county of Queens and State of New York, have invented certain new and useful Improvements in Automatic Advertisers for Public Conveyances, of which the following is a specification.

This invention relates to an improved advertising apparatus to be employed upon public conveyances, especially upon street-cars.

The object of the invention is to automatically operate mechanism for giving motion to an advertising-chart by means of the vibratory, rolling, or jolting motion of such conveyances, and to provide for automatically changing the direction of travel of the advertising-chart in order to give it a continuous movement back and forth by the same primary means.

To this end the invention consists in the combination, with suitable mechanism for imparting motion to an advertising-chart, of a weighted spring-supported lever adapted to be operated by the vibrating, oscillating, rolling, or jolting motion of a public conveyance, so as to display the advertising signs or devices upon the chart in proper rotation; and also in the combination, with said spring-supported weighted lever and chart-carrying rollers, of certain mechanism for reversing the movement of the chart-carrying rollers, as more fully hereinafter specified.

Referring to the accompanying drawings, Figure 1 represents a front elevation of an automatic advertising apparatus for street-cars embracing my invention, portions of the advertising-chart being broken away to expose the operating mechanism; Fig. 2, a detail showing the pendent arm and the operating pawl-connection with the power-shaft; Fig. 3, a detail showing the lever carrying the movable bearing of the power-shaft and the pawls for locking said movable bearing in either shifted position; Fig. 4, a detail showing the movable end of the driving-shaft in gear with the lower screw-shaft to move the chart downward; Fig. 5, a similar detail, showing the shifting-gear of the power-shaft engaging with the upper screw-shaft gear to move the chart upward. Fig. 6 is a detail, showing the spring of the lever M for effecting the shifting action of the main power-shaft; Fig. 7, a cross-section of the apparatus, and Fig. 8 a detail of the traversing-nut connection with the screw-shaft and slotted plate.

The various working parts of the apparatus are contained within and carried by a suitable box or casing, A. A lever, B, is secured to the back or other convenient portion of this box or casing, and is provided at its free end with a weight, C, which will vibrate with the motion of the conveyance. The said lever, in the present instance, consists of a bent metallic spring secured rigidly at one end to the back of the box or casing. At a point intermediate between the free and fixed ends of the said lever is loosely connected a dependent arm or link, E, having pivoted at its lower end reversely-acting pawls F, which are adapted to engage the teeth of a ratchet, G, on opposite sides of the same, the said pawls being held in normal positions of engagement with said wheel by means of springs H, which permit the pawls to slip to release the ratchet-teeth on the respective backward and forward movements of the said pawls, so as to give the ratchet-wheel a continuous movement in a forward direction as the lever is vibrated. The ratchet-wheel G is mounted on a power-shaft, I, which is journaled at one end in a fixed bearing, K, and at the other end in a bearing in a plate or arm, L, on the free end of a lever, M, pivoted at N to the back of the box or casing A. This pivoted lever M is provided with a forward projection, O, to which is secured one end of stout flat spring, P, the other end of said spring being secured to a link, R, connecting by pivoted joints two ends of rods S, the opposite ends of which are connected each with one end of the bent levers T, fulcrumed at U to the supports V, secured to the back of the box or casing. The other end of said levers T are connected, by means of cords Q or other suitable connections, to the pawls W, pivoted at A' to the back of the frame, and held in normal position by the springs B'. The said pawls W are adapted to engage alternately in recesses C', Fig. 3, in the plate or arm L on the lever M, for the purpose hereinafter more fully explained.

A cog-wheel, D, is mounted on the power-shaft I, and adapted to engage with either of the similar cog-wheels E', mounted, respectively, upon the screw-shafts F', journaled in bearings secured to the interior of the box or frame A. These screw-shafts have mounted upon them the traveling screw-nuts H', which are provided with extensions H², Fig. 8, setting and adapted to travel in the slotted ways I', formed in the plates K', secured to the back of the frame or casing A. These screw-nuts abut against the free arms of the levers T, so as to move these levers at the respective forward movements of said nuts. The said nuts are traversed by the rotation of the screw-shafts upon which they are mounted either in a forward or backward direction, according to the direction in which said shafts are rotated, by gearing connected with the main power-shaft I. The cog-wheels E' intermesh with similar cog-wheels, L', which are secured to the carrying or winding rollers M' of the advertising-chart N', the said rollers being journaled at each end in the front portion of the box or casing A. The chart at each end is secured to winding-rollers M', and passes over the guide-rolls O', journaled at the front of the box or casing, near the top and bottom of the same, so as to fill the entire front opening in the box or casing and conceal the operating mechanism therein.

To assist the vibratory action of the weight, I combine therewith a rebounding spring, Z, secured to the box or casing, and upon which the weight strikes in its descent and is repelled, thereby assisting to keep up the motion of the weight when once started.

The operation of my invention will be readily understood, in connection with the above description, to be as follows: The vibratory, oscillating, rolling, or jolting motion of the public conveyance in which the apparatus is used will cause a vibratory motion to the weighted lever B. This will, through the medium of the pawls H, impart a movement in a continuous direction to the ratchet-wheel G, mounted on the main power-shaft I, rotating the same. The cog-wheel D on the main power-shaft is adapted to intermesh with either of the cog-wheels E' on the screw-shafts F', according to the position of the parts, and will transmit a rotary motion to the wheel with which it intermeshes, and to the screw-shaft on which said wheel is mounted, transmitting motion to one or the other of the chart-rollers and winding the chart upon the same. The traversing screw-nut H', (on the shaft which is thus directly operated,) toward the end of its forward movement, will engage the free end of its bent lever T, shifting said lever so as to shift the lever M, carrying the movable bearing L for the main power-shaft, throwing the cog-wheel D on said shaft into gear with the opposite screw-shaft, F', thus putting the same in motion and releasing the first-mentioned screw-shaft from said cog-wheel D, thus changing the direction of travel of the advertising-chart, and so on continuously as long as the motion of the conveyance is kept up.

Although the device is designed especially for street-railway cars, it is evident that it can be applied to other traveling conveyances with equal advantage, and hence I do not limit myself to the use of the invention with any particular class of public conveyances.

When used on street-cars it is placed in the panels above the windows.

I claim—

1. In an advertising device for public conveyances, the combination, with an advertising-chart and suitable mechanism for moving it, of an oscillating or vibrating device adapted to be operated by the motion of the conveyance to operate the mechanism for carrying the chart, substantially as herein set forth.

2. The combination, in an advertising apparatus for public conveyances, of a spring-supported weighted lever, B, carrying a pawl or pawls, F, and a ratchet-wheel, G, mounted upon a main power-shaft, I, carrying a cog-wheel, D, adapted to be shifted and intermesh with suitable gearing to operate the mechanism for traversing the advertising-chart, substantially as specified.

3. In combination with the main driving-shaft I, having a movable bearing at one end, its operating mechanism and cog-wheel D, the alternating gearing E, with which said cog-wheel is adapted to intermesh, and suitable mechanism for automatically shifting said movable bearing to change the direction of travel of the advertising-chart, substantially as specified.

4. In combination with the main power-shaft I, having a movable bearing at one end, its operating mechanism and cog-wheel D, the cog-wheels E', mounted upon screw-shafts F', the traversing-nuts H', mounted on said screw-shafts, and the bent levers T, connected with the lever M, carrying the movable bearing of the main power-shaft, whereby said shaft is shifted automatically, substantially as and for the purposes specified.

5. In combination with the lever M, carrying the movable bearing of the main power-shaft, the pawls W, adapted to alternately engage recesses C' in the said movable bearing L, and the bent levers T, connected to the said pawls, whereby said pawls are automatically operated to secure the bearing of the main power-shaft in proper position when shifted, substantially as specified.

6. In an advertising device for street-cars, the combination, with an advertising-chart and suitable mechanism for moving it, of a spring-supported weighted lever adapted to be operated by the motion of the car to operate the mechanism for carrying the chart, and a rebounding or repelling spring, Z, for said weighted lever, substantially as herein set forth.

In testimony whereof I have hereunto set my hand.

REUBEN MAN WESTLAKE.

Witnesses:
F. STUART KING,
L. H. NASH.